Patented Nov. 27, 1945

2,389,660

UNITED STATES PATENT OFFICE 2,389,660

ISOMERIZATION PROCESS

Eric William Musther Fawcett and Eric Sylvester Narracott, Sunbury-on-Thames, England, assignors to Anglo-Iranian Oil Company Limited, London, England, a British joint-stock corporation No Drawing. Application February 9, 1943, Serial No. 475,278. In Great Britain April 7, 1941

4 Claims. (Cl. 260—683.5)

This invention relates to the conversion of normal aliphatic hydrocarbons such as n-butane and n-pentane or materials containing substantial proportions of such hydrocarbons, wholly or in part into the corresponding branched chain hydrocarbons such as isobutane and isopentane, or into mixtures containing substantial proportions of branched chain hydrocarbons of lower molecular weight, for example isobutane on conversion of n-pentane.

In such processes it is usual to employ as contact catalysts certain anhydrous metallic halides of which aluminum chloride is typical. However, in order to obtain a sufficiently high conversion rate it is usually found necessary to employ a catalyst activating agent such as hydrogen chloride or water, in addition to the simple metallic halide catalyst. The use of such activating agents presents certain difficulties, from the point of view of both corrosion and availability, and in the case of water because hydrolysis of the metallic halide occurs with ultimate destruction of the catalyst.

According to the invention hydrogen sulphide or inert gases containing hydrogen sulphide are used as catalyst activating agents in such processes. Such materials are readily available in plants processing hydrocarbons.

Hydrogen sulphide acts as a potent catalyst activating agent and has no deleterious effect on the life of the metallic halide catalyst.

The invention comprises the process conditions as hereinafter described.

Processes to which the invention relates may be carried out in the liquid or vapour phase and in batch or continuous operation.

A continuous stream of the hydrocarbon to be converted may advantageously be passed through a reaction vessel containing the catalyst in granular or other form alone or mounted on porous carriers or supports, the reaction vessel being maintained at the reaction temperature and pressure.

The product leaving the reaction vessel and containing substantial proportions of branched chain hydrocarbons may be fractionated to separate partially or wholly the normal and branched chain hydrocarbons, the normal hydrocarbons or fractions containing them being re-cycled to the same or other reaction vessel.

The reaction may be carried out at an elevated temperature not exceeding 300° C., usually in the temperature range 50° C.–200° C. Superatmospheric pressures may also be employed usually not exceeding 50 atmospheres. The proportion of hydrogen sulphide to be used as catalyst activating agent depends markedly on the operating pressure, but will not exceed 20% by weight of the butane stream. When operating at superatmospheric pressure in the vapour phase, the proportion of catalyst activating agent required is small, for example not greater than 5% by weight; thus excellent results may be obtained using 0.5% by weight on the hydrocarbon feedstock at an operating pressure of 10 atmospheres.

The following is an example of advantageous process conditions:

*Example.*—N-butane, containing 17% hydrogen chloride by volume of the total feed, was passed at a rate of 13.6 gas volumes/volume of catalyst/hour through a reaction vessel packed with lump aluminum chloride (through 5 on 10 mesh), maintained at 123° C. and at atmospheric pressure. The product stream leaving the reaction vessel contained 13.8% isobutane.

The same reaction vessel was refilled with the same aluminum chloride catalyst and maintained at the same temperature and pressure, and a stream of n-butane passed at the same rate in the absence of added hydrogen chloride until no hydrogen chloride was visible in the exit stream. A sample of issuing gas at this time contained 3.0% isobutane. The stream of n-butane was then changed to one containing 17% hydrogen sulphide by volume, and after 8 hours running the issuing gases were found to contain 30.8% isobutane.

We claim:

1. A process which comprises isomerizing at least one straight chain paraffin containing at least four carbon atoms per molecule under isomerization reaction conditions and under superatmospheric temperatures and pressures while in contact with aluminum chloride and in the continuing presence of between about 0.5 and about 20 weight per cent of hydrogen sulfide based on the normal paraffin feed.

2. A process which comprises isomerizing at least one normal paraffin containing at least four carbon atoms per molecule under isomerization reaction conditions and under superatmospheric temperatures and pressures, in the vapor phase, in continuing contact with aluminum chloride and between about 0.5 and about 5 weight per cent of hydrogen sulfide based on the normal paraffin feed.

3. A process as in claim 2 wherein the feed stock comprises essentially normal butane.

4. A process as in claim 2 wherein the feed stock comprises essentially normal pentane.

ERIC WILLIAM MUSTHER FAWCETT.
ERIC SYLVESTER NARRACOTT.